Aug. 27, 1957 K. CARLTON ET AL 2,804,209
WATER INTAKE SCREEN
Filed March 6, 1953 4 Sheets-Sheet 4

United States Patent Office 2,804,209
Patented Aug. 27, 1957

2,804,209

WATER INTAKE SCREEN

Kirkendall Carlton, San Mateo, and Harvey V. Eastling, Burlingame, Calif., assignors to Link-Belt Company, a corporation of Illinois Application March 6, 1953, Serial No. 340,882

11 Claims. (Cl. 210—158)

This invention relates to new and useful improvements in fish removal devices for traveling water intake screens.

In recent years, the problem of conserving fish in large streams, rivers and lakes for commercial and recreational purposes has become increasingly important because of the greatly expanded demand for obtaining water from such sources for industrial and irrigation purposes. For the most part, the diversion of water from its natural sources to industrial and irrigation projects involves a preliminary screening of the water to remove the trash and other waste material. In connection with such screening operations, it has been found that large numbers of small fish or fingerlings have been removed and disposed of with the trash or refuse with the result that the number of fish that are permitted to mature is materially reduced.

Attempts have been made to prevent this destruction of small fish by reducing the rate of flow of water through the screen to a value which will allow the fish to swim away from the screen. In places where this procedure has been adopted, the amount of water delivered to its intended place or places of use has been so greatly reduced that it has been necessary to substantially increase the total screening area by the installation of additional screens or the enlargement of existing ones.

It is the primary object of this invention to provide a fish removal mechanism for traveling water intake screens which will function to prevent the destruction of fish while permitting a maximum flow of water through the screens.

A further important object of the invention is to provide a fish removal device for traveling water intake screens which will safely separate fish from the trash removed by the screens.

Still another object of the invention is to provide a traveling water intake screen which will collect the trash and fish carried to the screen by the flow of water through the latter and will separately remove the trash and fish from the screen in a manner to prevent injury to the fish.

A still further object of the invention is to provide a traveling water intake screen which will elevate fish from the stream flowing through the screen with a sufficient quantity of water to prevent injury to the fish and will subsequently safely return the fish to their natural environment.

Other objects and advantages of the invention will be apparent during the course of the following description.

Figure 1:
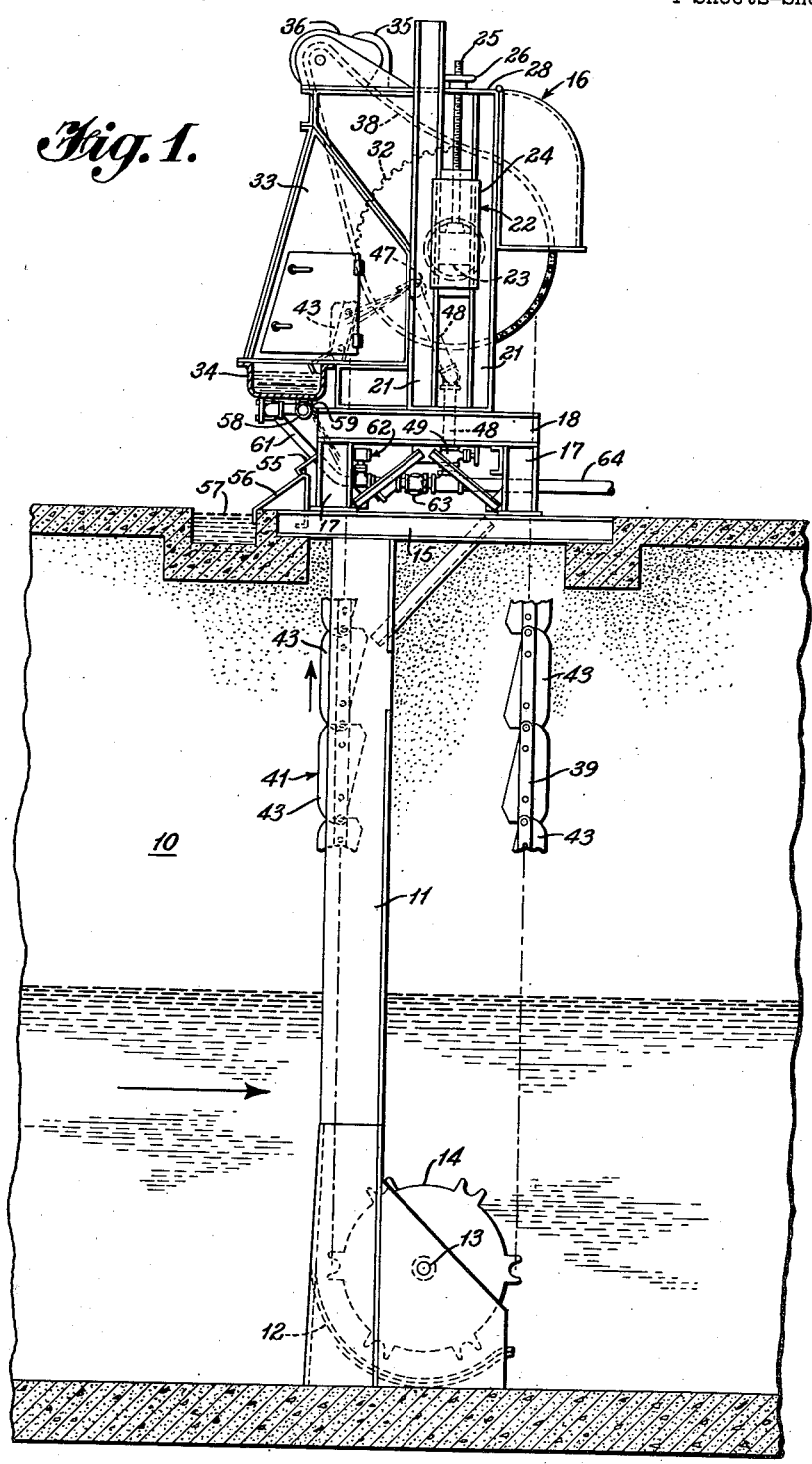
Figure 2:
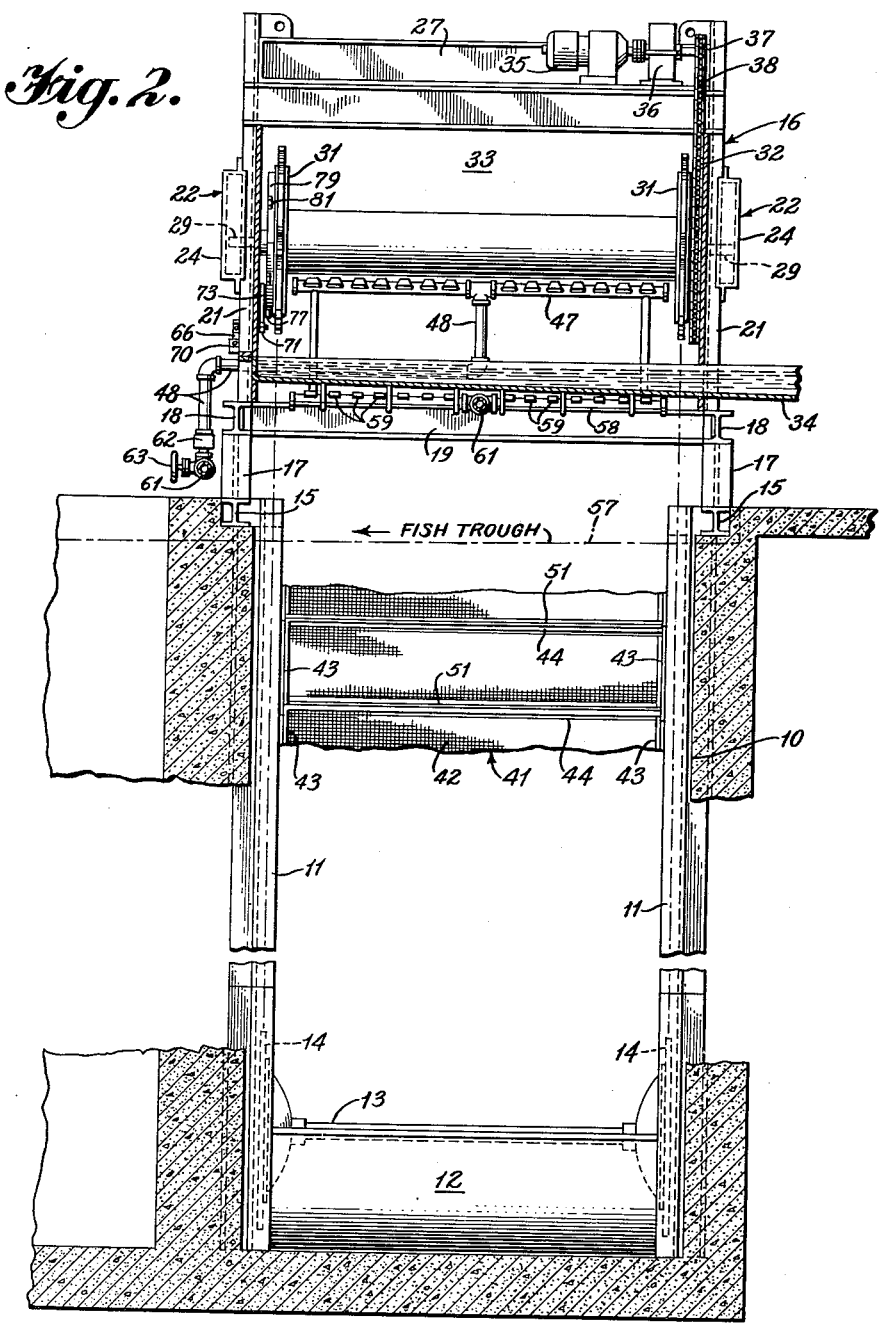
Figure 3:
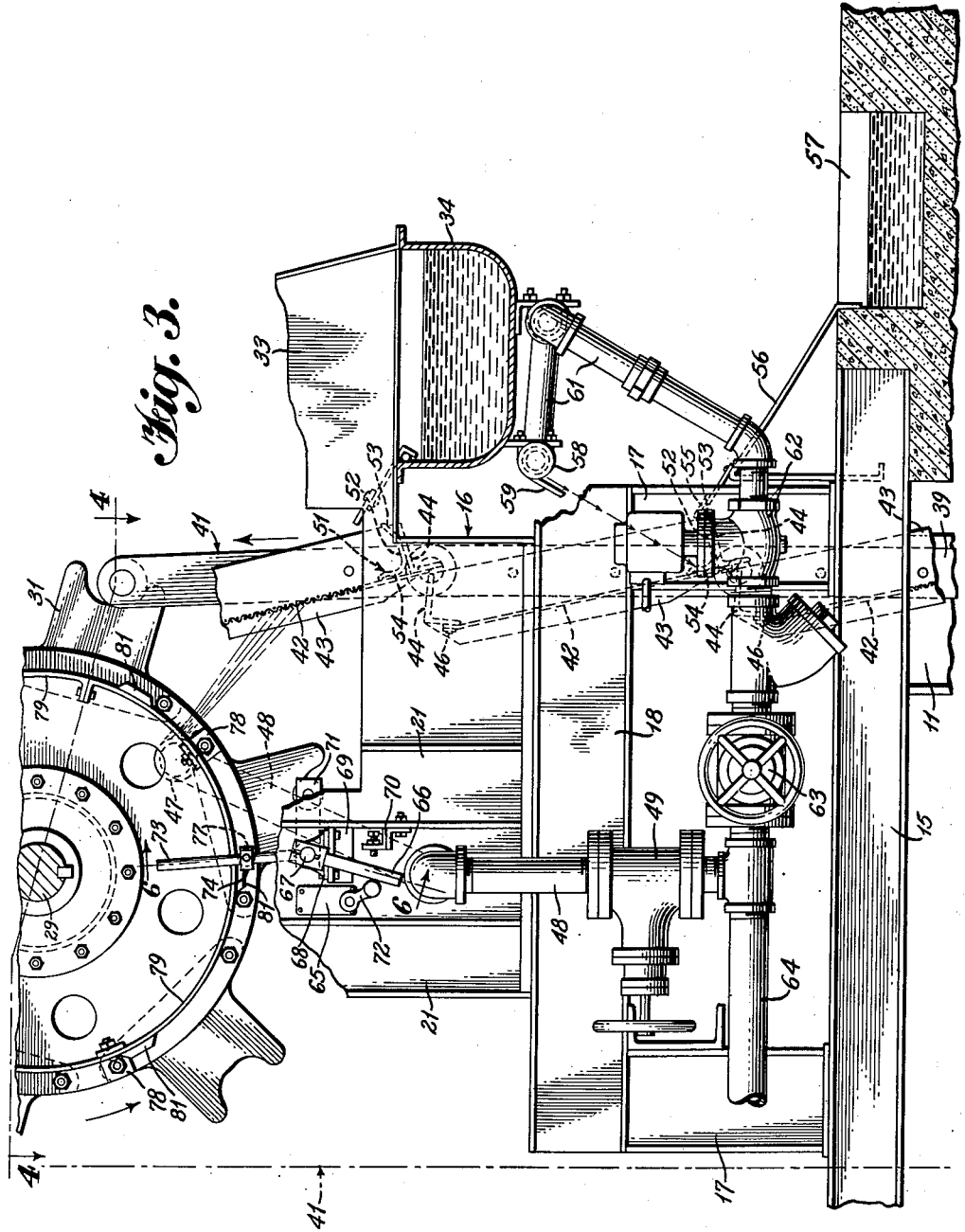
Figure 4:
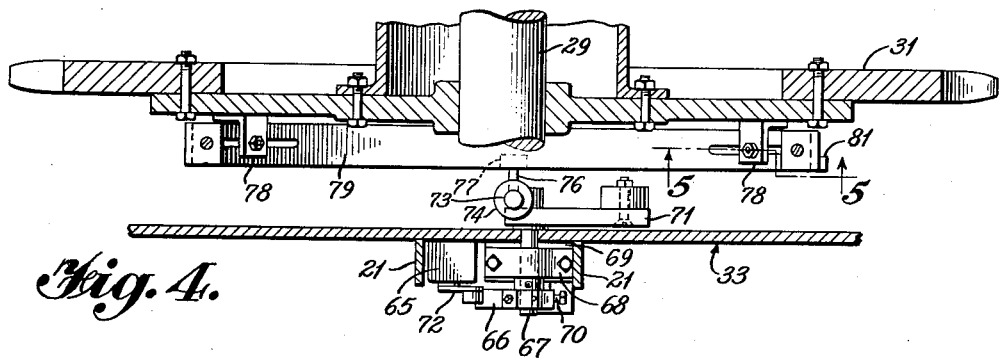
Figure 5:
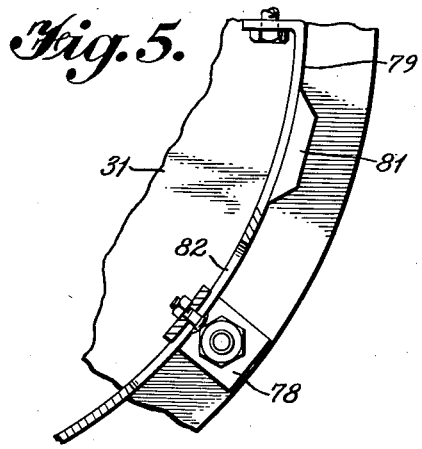
Figure 6:
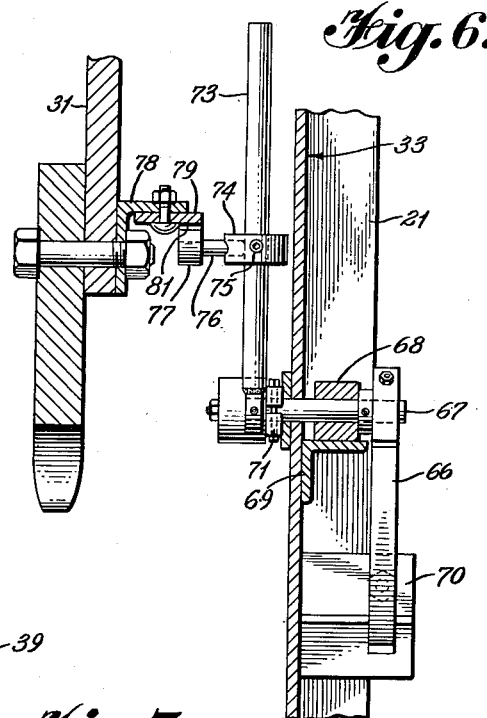
Figure 7:
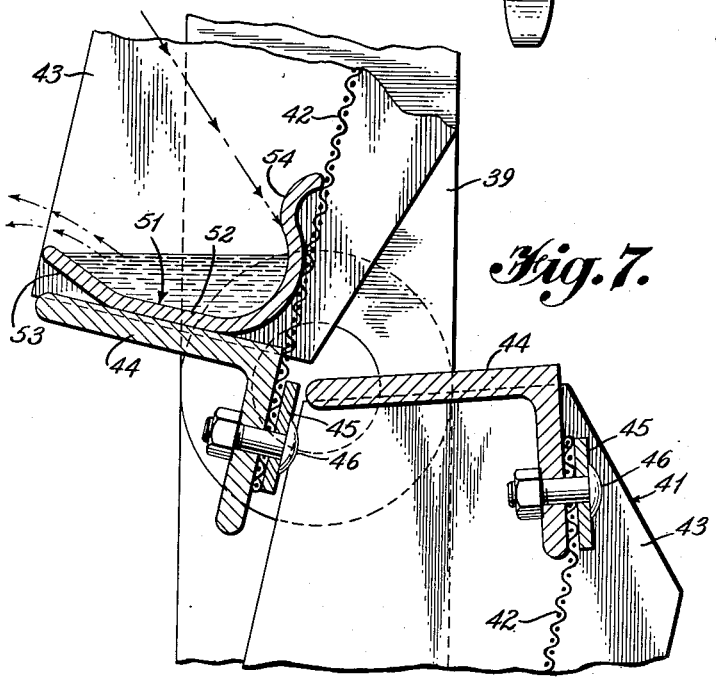

In the accompanying drawings forming a part of this specification and in which like reference characters are employed to designate like parts throughout the same, Figure 1 is a side elevational view, partly broken away, of a traveling water intake screen embodying this invention, Figure 2 is a front elevational view, partly in cross-section, of the screen illustrated in Fig. 1, Figure 3 is a fragmentary, enlarged side elevational view, partly broken away, of the head end of the screen viewed from the side opposite that illustrated in Fig. 1, Figure 4 is a fragmentary sectional view taken on line 4—4 of Fig. 3, Figure 5 is a fragmentary sectional view taken on line 5—5 of Fig. 4, Figure 6 is a fragmentary sectional view taken on line 6—6 of Fig. 3, and Figure 7 is a fragmentary, enlarged sectional view showing the adjacent edge portions of two interconnected screen panels.

In the drawings, wherein for the purpose of illustration, is shown the preferred embodiment of this invention, and first particularly referring to Figs. 1 and 2, reference character 10 designates in its entirety a channel in which the traveling water intake screen is located to remove various types of refuse from water flowing through the channel. It will be appreciated that the water enters the channel 10 from any convenient natural source, such as a river, a large stream or a lake, and flows through the channel in the direction indicated by the arrow in Fig. 1.

Extending vertically along opposite sides of the channel 10 are the parallel uprights 11, the bottom portions of which are connected to a boot 12 that extends laterally across the channel to prevent refuse from passing beneath the intake screen and to prevent jamming, or damage to, the foot shaft 13 and sprocket wheels 14 which support the lower end of the traveling screen structure. Channel beams 15 extend longitudinally along each side of the channel 10 adjacent the upper ends of the uprights 11 to form a supporting base for the head portion of the screen which is designated in its entirety by the reference character 16.

The mounting for the head portion 16 consists of corner posts 17 spaced longitudinally on the beams 15 at each side of the channel 10, beams 18 extending between the tops of the posts 17 on each side of the channel, and beams 19 mounted to extend across the channel between the tops of the posts.

Extending vertically upwardly from the beam 18 on each side of the channel 10 are a pair of vertical side frame members 21 which are spaced longitudinally of the beam 18 for receiving therebetween a take-up mechanism 22 which is centered in vertical alinement with the foot shaft 13. Each of the take-up mechanisms 22 includes a bearing 23 which is guided for movement between the frame members 21 by a flanged block 24 and is vertically adjustably supported by a threaded rod 25 and an adjusting nut 26. Lateral support between the side frame members 21 is provided by a transverse beam 27 and plate 28, the latter having openings through which the rods 25 extend with the adjusting nuts 26 resting upon the top of the plate so that rotation of the nuts will cause vertical movement of the bearings 23.

Journaled in the bearings 23 is a head shaft 29 upon which are mounted the head sprockets 31, in vertical alinement with the foot sprockets 14 at each side of the channel 10, and a drive sprocket 32 between one of the sprockets 31 and the adjacent side frame members 21.

A sheet metal housing 33, of any suitable construction, functions to substantially enclose the head shaft 29, head sprockets 31 and drive sprocket 32. The upstream portion of the housing 33 has formed in its bottom a refuse trough 34 which extends transversely across the channel adjacent the vertically rising, upstream run of the traveling screen structure.

Mounted on the top of the housing 33 is a motor 35 which is suitably connected through a speed reducing unit 36 to the sprocket 37 over which is trained a drive chain 38 for rotating the drive sprocket 32.

The traveling screen structure comprises two endless chains 39 which are trained over the vertically alined sets of head and foot sprockets 31 and 14, respectively, for movement through two closed paths, to provide an active or upstream run through which the chains 39 move upwardly and a return run through which the chains move downwardly.

Connected to, and extending transversely of the channel between, alined pitches of the two chains 39 are a plurality of screen trays 41. As is best illustrated in Fig. 7, adjacent longitudinal edges of the screen trays are off-set in opposite directions relative to the pitch lines of the chains so that the screen cloths 42 of the trays present screening surfaces that face slightly upwardly as the trays are moved through their active run.

Referring now to Figs. 3 and 7, it will be seen that each of the trays 41 is formed with a pair of side plates 43 connected to the alined pitches of the chains 39. Extending between the side plates 43 at the longitudinal edges of the trays 41 are angle members 44 between which the screen cloths 42 are stretched and to which the cloths are connected by backing plates 45 and bolts 46. It will be noted that the angle members 44 project outwardly from the cloths 42 at both longitudinal edges of the trays 41 and are so arranged relative to the points of articulation between the pitches of the chains 39 as to prevent refuse from passing between the adjacent edges of the trays as they are moved through their active run.

As illustrated in Figs. 1, 2 and 3, the refuse collected on the cloths 42 of the screen trays 41, as the latter move through their active run, is removed from the cloths by jets of water discharged from a stationary header 47 which extends transversely of and is positioned adjacent the inner side of the active run of the trays 41 at a level above that of the refuse trough 34. The jets are directed downwardly toward the refuse trough 34 and function in a conventional manner to remove the refuse from the screen cloths 42 as they move past the jets. Water is introduced into the middle of the header 47 by a pipeline 48 which passes outwardly through the side of the housing 16 and is provided with a shut-off valve 49 by means of which the flow of water through the header 47 can be discontinued or regulated as desired.

Mounted on the angle members 44 at the trailing edges of the screen trays 41 are the pans 51 which extend entirely across the trays and are arranged to open upwardly while moving through the active run. As is best illustrated in Fig. 7, each of the pans 51 is formed with a bottom 52 which rests upon its associated angle member 44. The outer edge wall 53 of each pan 51 is inclined upwardly at an obtuse angle with the bottom wall 52 to provide a discharge lip for each pan. The inner wall 54 of each pan 51 lies generally along the adjacent portion of the screen cloth 42 but is reversely curved in cross-section to present a rounded inner surface that merges into the bottom 52 of the pan. It will be readily apparent that, when the screen trays 41 move upwardly through their active run, each pan 51 will dip a quantity of water from the stream flowing through the channel 10. It will also be apparent that any fish that are carried against the screen cloths 42 by the flow of water through the channel 10 also will be dipped out of the water by the pans 51 as the latter emerge from the water.

As the trays 41 are moved upwardly through their active run, the pans 51 with the water and fish therein move through a discharge zone in which the discharge lips of the pan walls 53 engage and move past the resilient lip 55 of a spill plate 56. The spill plate 56 extends downwardly and forwardly from the path of travel of the trays to a fish removal trough 57 which is kept supplied with water to a depth that will prevent injury to the fish while they are returned to their habitat. When the discharge lip of a pan 51 has engaged the resilient lip 55 of the spill plate 56, a plurality of intermittently discharged jets of water are delivered against the inner reversely curved wall 54 of the pan, see Fig. 7, to flush the water and fish from the pan onto the spill plate 56 and subsequently into the trough 57. From the trough 57, the fish may be returned to a remote point in the stream or lake from which the water in the channel 10 is drawn. The discharge of water into each pan 51 is continued only while the pan is within the effective range of the jets and is then discontinued until the next successive pan is moved into alinement with the lip 55 of the spill plate 56.

The intermittently operated spray device for flushing the water and fish from the pans 51 consists of a header 58 suspended from the refuse trough 34, as shown in Figs. 1 and 3, and provided with a plurality of spray directing baffles 59 which deflect the jets of water downwardly and rearwardly toward the active run of the screen. Water is supplied to the header 58 by the pipeline 61 which has the solenoid valve 62 connected therein for effecting the intermittent flow of water to the header. A manually operated valve 63 also is connected in the pipeline 61 for controlling the amount of water flowing to the solenoid valve 62 so that the spray of water from the header 58 may be regulated as desired. It will be noted that a single pipe 64 may be used to supply water under pressure to both of the pipes 48 and 61 associated with the headers 47 and 58, respectively.

The supply of current to the solenoid valve 62 is controlled by a limit switch 65 mounted between the side frame members 21. The operation of the limit switch 65 is so synchronized with the movement of the pans 51 that the valve 62 will be opened to effect discharge of water into the pans only while the pans are in their discharge zone.

The apparatus for effecting the aforesaid synchronized operation of the limit switch 65 is best illustrated in Figs. 3 to 6 as consisting of a switch operating arm 66 clamped to a shaft 67 that is supported for oscillation on the side of the housing 33 by a bearing 68 carried by a bracket 69 located between the side frame members 21. A stop 70 limits movement of the arm 66 away from the switch 65. The inner end portion of the shaft 67 extends into the interior of the housing 33 and has mounted thereon a counterweight arm 71 which extends from the shaft in a direction to maintain the actuating arm 66 engaged with the operating arm 72 of the limit switch 65. A follower arm 73 is also mounted on the inner end of the shaft 67 and extends into axially spaced relationship with the adjacent head sprocket 31. Mounted on the follower arm 73 for axial movement therealong is a follower sleeve 74 that is clamped at a fixed position on the arm by a set screw 75. Projecting from the collar 74 toward the adjacent sprocket 31 is a stub shaft 76 upon which is mounted a follower roll 77.

Mounted on the side of the sprocket 31 adjacent the follower arm 73 are a plurality of mounting brackets 78 for carrying an annular cam support 79 located between the sprocket 31 and the follower arm 73. It will be readily apparent that rotation of the sprocket 31 to move the screen trays 41 will effect rotation of the annular cam support 79 so that the cam lugs 81, mounted on the periphery of the support 79, will engage the follower roll 77 each time that a pan 51 is moved through its discharge zone. Accurate adjustment of the positions of the cam lugs 81 is provided by slots 82 in the annular cam support 79 which enable the cam support to be rotated relative to the sprocket 31.

Engagement between a cam lug 81 and the follower roll 77 at the same time that the outer edge of the side 53 of a pan 51 is moved into alinement with the resilient lip 55 will cause the follower arm to rotate the shaft 67 and the switch actuating arm 66. Rotation of the arm 66 will in turn cause the arm 72 of the limit switch 65 to be rotated for opening the solenoid valve 62 to permit water to flow from the header 58 into the pan 51. The spraying of water into the pan will continue for so long as the follower roll 77 is engaged by the cam lug 81 and will be discontinued when the sprocket 31 has rotated to move the pan 51 out of alinement with the spray and to move the cam lug 81 out of engagement with the follower roll 77. The above described operation of the solenoid valve 62 is repeated as each cam lug 81 is moved into engagement with the follower roll 77 and as each pan 51 is moved into its discharge zone.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, we claim:

1. A water intake screen for the separate disposal of refuse and fish removed from a flowing stream of water, comprising an endless series of interconnected screen trays, means supporting said trays for movement through a closed path including an active run in which the trays move upwardly through said stream, a plurality of pans mounted on the upstream side of said trays and projecting outwardly therefrom with their open tops facing in the direction of movement of the trays, said pans having imperforate bottoms and sides with the sides of sufficient depth to provide recesses for lifting and holding water from said stream and any fish that may be deposited in the pans, means for directing a spray of water into each pan as the latter moves through a given zone in said active run to flush from said pan the fish that have been deposited therein, means for receiving the flushed fish for return to the stream at a remote point from said screen, means for spraying water through the screens of the trays at a zone in said active run that is spaced from said fish removal zone to dislodge refuse therefrom, and means separate from the fish receiving means for receiving and carrying away the dislodged refuse.

2. A water intake screen for the separate disposal of refuse and fish removed from a flowing stream of water, comprising an endless series of interconnected screen trays, means supporting said trays for movement through a closed path including an active run in which the trays move upwardly through said stream, a plurality of pans mounted on the upstream side of said trays and projecting outwardly therefrom with their open tops facing in the direction of movement of the trays, said pans having imperforate bottoms and sides with the sides of sufficient depth to provide recesses for lifting and holding water from said stream and any fish that may be deposited in the pans, means for directing a spray of water against the inner side of each pan as it moves through a given zone in said active run to flush over the outer side of the pan the fish that have been deposited therein, means for interrupting the operation of said spray directing means while the screens of the trays are moved through said fish removal zone, means for receiving the flushed fish for return to the stream at a remote point from the screen, means for continuously spraying water outwardly through the screens of the trays at a zone in said active run that is spaced upwardly from said fish removal zone to dislodge refuse from the screens, and means separate from the fish receiving means for receiving and carrying away the dislodged refuse.

3. A water intake screen for the separate disposal of refuse and fish removed from a flowing stream of water, comprising an endless series of interconnected screen trays, means supporting said trays for movement through a closed path including an active run in which the trays move upwardly through the stream, a pan mounted on the upstream side of each of said trays and projecting outwardly therefrom, said pans being formed of imperforate bottoms and sides with the sides of sufficient depth to provide recesses for dipping and holding water and fish from the stream, nozzle means positioned adjacent and outwardly of said active run for directing a spray of water into each pan as the latter moves through a given zone in the active run to flush the dipped fish from said pan, a trough for receiving the flushed fish for return to the stream at a remote point from said screen, nozzle means positioned adjacent and inwardly of said active run for spraying water outwardly through the screens of the trays at a zone in said active run that is spaced upwardly from said fish removal zone to dislodge refuse from the screens, and a trough separate from the fish receiving trough for receiving and carrying away said refuse.

4. A water intake screen for the separate disposal of refuse and fish removed from a flowing stream of water, comprising an endless series of interconnected screen trays movable through a closed path including an active run in which the trays move upwardly through the stream, a pan mounted on the upstream side of each of said trays and projecting outwardly therefrom, said pans being formed of imperforate bottoms and sides with the sides of sufficient depth to provide recesses for dipping and holding water and fish from the stream, nozzle means positioned adjacent and outwardly of said active run for directing a spray of water toward a given zone in the active run, a pipe for supplying water to said nozzle means, a valve in said pipe, valve operating means for automatically opening said valve only while each pan moves through said given zone to cause said spray of water to flush the dipped fish from said pan, means for receiving the flushed fish for return to the stream at a remote point from the screen, means for spraying water through the screens of the trays at a zone in said active run that is spaced above said fish removal zone to dislodge refuse therefrom, and means separate from said fish receiving means for receiving and carrying away said dislodged refuse.

5. A water intake screen for the separate disposal of refuse and fish removed from a flowing stream of water, comprising an endless series of interconnected screen trays movable through a closed path including an active run in which the trays move upwardly through said stream, a plurality of pans mounted on the upstream side of said trays and projecting outwardly therefrom with their open tops facing in the direction of movement of the trays, said pans being formed of imperforate bottoms and sides with the sides of sufficient depth to provide recesses for dipping and holding water and fish from said stream, each of said pans having a shallow outer wall arranged at an obtuse angle with the bottom of the pan and a deep inner wall having a curved portion connected to the bottom of the pan, means for directing a spray of water against the surved portion of the inner wall of each of said pans as it moves through a given zone in said active run, the curved portion of the inner wall of said pan causing said spray to flush over the outer side of the pan the fish that are in the pan, means for receiving the flushed fish for return to the stream at a remote point from said screen, means for spraying water through the screens of the trays at a zone in said active run that is spaced from said fish removal zone to dislodge refuse therefrom, and means separate from said fish receiving means for receiving and carrying away the dislodged refuse.

6. A water intake screen for the separate disposal of refuse and fish removed from a flowing stream of water, comprising an endless screen structure traveling through a closed path including an active run movable upwardly through the stream, a plurality of pans mounted in uniformly spaced relation on the upstream side of said screen structure with their open tops facing in the direction of movement of the screen structure through said active run, said pans being formed of imperforate bottoms and sides with the sides of sufficient depth to provide recesses for dipping and holding water and fish from the stream as the pans emerge therefrom, means for removing fish from the emerged pans, means for carrying away the removed fish, means for flushing refuse from the active run of the screen structure at a location above the fish removal means separate from the means for carrying away fish, and means for carrying away the flushed refuse.

7. A water intake screen for the separate disposal of refuse and fish removed from a flowing stream of water, comprising an endless screen structure traveling through a closed path including an active run movable upwardly through the stream, a plurality of pans mounted in uniformly spaced relation on the upstream side of said screen structure with their open tops facing in the direction of movement of the screen structure through said active run, said pans being formed of imperforate bottoms and sides with the sides of sufficient depth to provide recesses for dipping and holding water and fish from the stream as the pans emerge therefrom, means for directing a spray of water into the pans after they have emerged from the stream to flush fish from the pans, means for limiting the operation of said spray directing means to the periods when the pans are positioned to receive the spray of water, a flooded trough for carrying away the fish flushed from the pans, stationary nozzle means located above the pan spraying means for dislodging refuse from the active run of the screen structure subsequent to the flushing of fish from the pans, and means separate from the flooded trough for carrying away the dislodged refuse.

8. A water intake screen for the separate disposal of refuse and fish removed from a flowing stream of water, comprising an endless series of interconnected screen trays, each tray being formed at its trailing edge portion by an angle member, means supporting said trays for movement through a closed path including an active run in which the trays move upwardly through the stream, an imperforate pan, of sufficient depth to retain water and fish, supported on the said angle member of each tray, to open upwardly while traveling along the active run of the screen, means for removing fish from said pans as the latter move through a given zone in said active run, and means for removing refuse from said screen trays at a zone that is spaced from said fish removal zone.

9. A water intake screen for the separate disposal of refuse and fish removed from a flowing stream of water, comprising an endless series of interconnected screen trays, means supporting said trays for movement through a closed path including an active run in which the trays move upwardly through the stream, imperforate pans projecting upstream from said trays for lifting and holding water and fish that are deposited thereon, means for flushing fish from said pans as the latter move through a given zone in said active run, means for receiving the flushed fish for return to the stream at a remote point from said screen, means for dislodging refuse from the screens of the trays at a zone in the path of movement of the trays that is spaced in following relationship with said fish flushing zone, and means separate from the means for receiving the fish for receiving and carrying away the dislodged refuse.

10. A water intake screen for the separate disposal of refuse and fish removed from a flowing stream of water, comprising an endless series of interconnected screen trays, means supporting said trays for movement through a closed path including an active run in which the trays move upwardly through the stream, imperforate pans projecting upstream from said trays for lifting and holding water and fish that are deposited thereon, means for flushing fish from said pans as the latter move through a given zone in said active run, means for receiving the flushed fish for return to the stream at a remote point from said screen, means for spraying water through the screens of the trays at a zone in the path of movement of the trays that is spaced in following relationship with said fish flushing zone to dislodge refuse therefrom, and means separate from the fish receiving means for receiving and carrying away the dislodged refuse.

11. In water screening apparatus comprising an endless series of screen elements mounted for serial rectilinear movement between a screening position in a channel for containing a body of flowing water and a cleaning position above such screening position, fluid discharging means at said cleaning position for effecting removal of trash accumulations from the screen elements moved thereto, the combination therewith of means for protecting fish caught against the screen elements from harm by said trash removing means, comprising water retaining troughs carried by such screen elements for receiving such fish, and means disposed intermediate said screening and cleaning positions for receiving the fish from said troughs and returning them to said channel before they can be acted upon by said fluid discharging trash removal means.

References Cited in the file of this patent
UNITED STATES PATENTS

| | | |
|---|---|---|
| 1,208,655 | Reynolds | Dec. 12, 1916 |
| 1,593,169 | Geiger | July 20, 1926 |
| 1,640,653 | Geiger | Aug. 30, 1927 |
| 1,815,137 | Bleyer | July 21, 1931 |
| 1,910,860 | Sayers | May 23, 1935 |
| 1,942,381 | Benesh | Jan. 2, 1934 |